Dec. 16, 1941.    R. POOLE    2,266,566
MEANS FOR MEASURING OR GAUGING THE SIZE OF ORIFICES OR ARTICLES
Filed Aug. 31, 1939
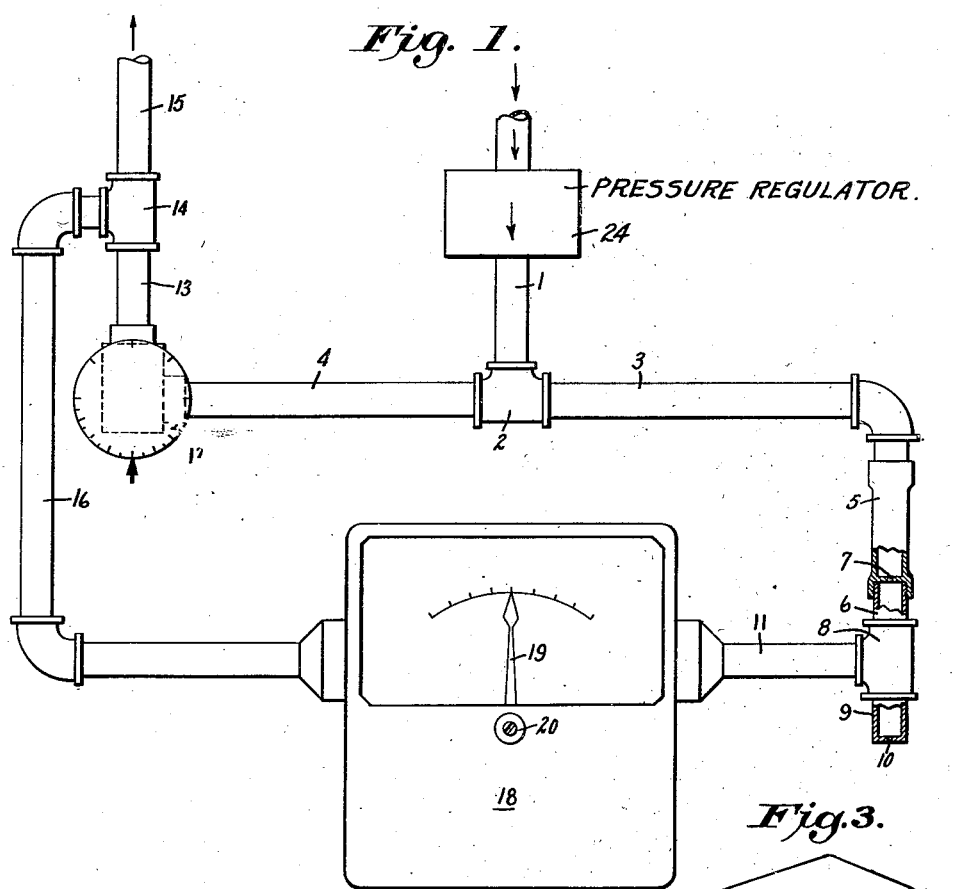
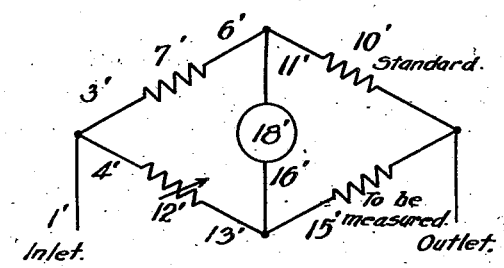
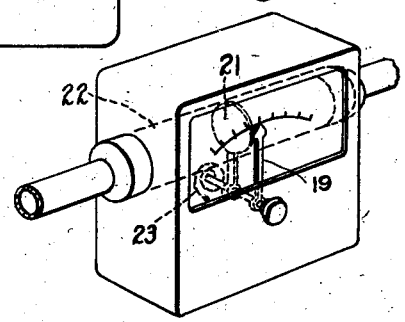
Inventor:
Ralph Poole,
by Harry E. Dunham
His Attorney.

UNITED STATES PATENT OFFICE 2,266,566

MEANS FOR MEASURING OR GAUGING THE SIZE OF ORIFICES OR ARTICLES

Ralph Poole, Bredbury, England, assignor to General Electric Company, a corporation of New York Application August 31, 1939, Serial No. 292,937
In Great Britain September 1, 1938

2 Claims. (Cl. 73—51)

This invention relates to means for measuring or gauging the size of orifices or articles, or assessing the degree of perfection of other features of the article, by means of fluid flow. Such means using air as the fluid are commonly employed for checking up repetition work in manufacturing processes, for example in gauging the bore of an engine cylinder, where a plug of known diameter or cross-section is inserted in the bore and air from a determined pressure source passed into the bore by way of passages in the plug, the amount of air flow, which will depend upon the leakage of air between the plug and the side of the bore, providing an indication of the size of the bore. In like manner by comparison with the size of a known opening or orifice the cross-sectional area of an article, or at least the discrepancy from a desired size can be estimated. The known method is applicable to other measurements than of gross dimensions of a manufactured article, for instance to the assessment of surface finish, parallelism of surfaces, integrity of structure and so on, and such other applications are hereinafter included broadly in the term "gauging."

In accordance with the present invention, fluid from a pressure source is adapted to be fed through a forked duct or duct system, each branch of which fork includes means for impeding the flow of fluid, for instance a member inserted in, or forming part of, the ducting but preferably in the form of a calibrated orifice or constricted portion, and which branches lead, the one to an orifice of standard size or gauge, and the other to an orifice the size of which is to be measured or to an orifice in which is located or adapted to be located the article whose size is to be measured, and wherein the pressures arising in the respective ducts subsequent to the locations at which the fluid flow is impeded as aforesaid, but prior to the test and standard orifices respectively, are caused to act differentially upon an indicating device whereby to provide a comparison between the size or other characteristics of the test orifice or article and that or those of the standard orifice, or of an article similar to the test article which when replacing it in the test orifice causes a zero or datum indication of the indicating device.

In practising the invention the indicating device may comprise a pivoted or biased vane located in a passageway connecting the two ducts leading to the test and standard orifices respectively but adapted so as not completely to obstruct the passageway and provided with an externally visible pointer or other indicating means.

Preferably the indicating vane is biased to an off-zero position and the standard orifice is of such size, or has such characteristics, that when the test orifice or article is of correct gauge a flow of fluid is produced through the indicating device which is effectual to restore the vane against the bias so as to bring the pointer or indicating means to the zero position. Such arrangement may generally be found to produce the more accurate results since the accuracy of the flow indicator may be impaired when the fluid flow becomes very small. It will be understood, however, that my invention is not limited to the precise form of flow indicator illustrated and does not exclude the use of other types of fluid flow indicating instruments.

In carrying out the invention the branch of the forked duct leading to the test orifice may include a calibrated orifice, for example an adjustable needle valve, and the branch of the duct leading to the standard orifice may include an orifice of fixed size. The standard orifice, and preferably the orifice in the branch of the duct leading to the standard orifice, may preferably each comprise one of a series of interchangeable nozzles. With this provision the apparatus may be employed for performing a number of different tests. The standard orifice and the test orifice should preferably discharge to a common back pressure, being conveniently open to atmosphere.

In order that the invention may be fully understood it will now be described with reference to the accompanying drawing, Fig. 1 of which illustrates diagrammatically an embodiment of the invention, certain portions of the apparatus being shown in part-section for convenience. Since the principle involved is closely analogous to that of the better known Wheatstone bridge the description which follows may be the more readily appreciated by reference simultaneously to Fig. 2 wherein the equivalent electrical elements have been marked with reference numerals corresponding to those of Fig. 1 but accented in each case. Fig. 3 is a perspective view of the fluid flow indicating instrument represented in Fig. 1 and diagrammatically showing the interior mechanism thereof.

Referring to the drawing, the duct 1 from a source (not shown) of air or other fluid under pressure bifurcates at the joint 2 into the ducts 3 and 4 respectively. The duct 3 communicates through a detachable connecting tube 5 with a tubular attachment 6 having an axially located orifice 7 of determined size. The attachment tube 6 communicates through a connector 8 on the one hand with a tubular attachment 9 having an axially located orifice 10 of determined size and on the other hand with a duct 11. The duct 4 is connected through a calibrated needle valve 12 with a duct 13 which communicates through a connector 14 on the one hand with a duct 15 and on the other hand with a duct 16. The ducts 11 and 16 are connected the one to the inlet and the other to the outlet end of a meter, which is indicated generally at 18, adapted to measure and indicate the amount of fluid flowing between the inlet and outlet connections thereof. The details of the fluid flow indicator are not shown in Fig. 1 of the drawing. As illustrated in Fig. 3, the flow indicator may be constituted by a centre reading instrument comprising a pivoted vane 21 located in a passageway 22 extending between the inlet and outlet connections of the meter but arranged so as not completely to obstruct the passageway. Said pivoted vane is moreover connected to an externally visible pointer, indicated at 19, and is equipped with associated biasing means such as a spiral spring 23, which is conveniently adjustable, as by means of the screw indicated at 20 in Fig. 1, so that the indicating pointer 19 will normally occupy a zero or datum position from which it will move in one direction when the flow of fluid through the meter is in one direction, while moving to the opposite side of the zero or datum position when the flow of fluid is reversed. The connection or means by which the zero setting screw 20 adjusts the spiral spring 23 is not illustrated as this is a conventional arrangement which does not form a part of my invention. As is known to those skilled in the art, it is customary in deflecting instruments having zero setting screws and spiral biasing springs to secure one end of the spiral spring, usually the inner end, to the rotatable shaft carrying the deflecting pointer and to secure the other end of the spiral spring to a support which is adjustable in position and connected through suitable linkage to the zero setting screw or knob, with suitable means such as a friction spring for maintaining the spiral spring support in the position to which it is adjusted by the zero setting screw.

The duct 15 will be connected to the measuring head (not shown) that is to say to an attachment which includes the orifices whose size is to be gauged or an orifice in which is adapted to be located the article whose size is to be gauged, and which orifice is herein referred to as the test orifice.

With the duct 1 connected to a source of pressure air or other fluid and the orifice 10, herein referred to as the standard orifice, as well as the aforesaid test orifice, open to atmosphere or at least at a common back pressure, the arrangement constitutes a fluid flow network after the manner of an electric Wheatstone bridge circuit, the orifice 7 and the valve 12 offering the one a fixed resistance and the other a variable resistance to the flow of fluid to the standard orifice 10 and the test orifice respectively, and the flow indicator 18 providing a means for detecting any unbalance of fluid flow which will be caused by any difference between the amount of fluid passed by the test orifice and the amount or a determined proportion or multiple of the amount passed by the standard orifice 10, after the manner of the galvanometer of a Wheatstone bridge electrical circuit.

In one method of operation, the needle valve 12 may be adjusted to give a discharge equal to that of the orifice 7, so that with the standard orifice 10 so selected as to pass the same amount of pressure fluid as would the test orifice or the orifice in which the test article is inserted, there will be no flow of fluid through the fluid flow indicator 18 when the test orifice or article is of standard size, whereas the passage of fluid through the indicator caused by an imperfect test orifice or article will indicate the divergence from standard size. By appropriate variation of the ratio between the flow permitted by the valve 12, and that permitted by the orifice 7, the apparatus can be used for gauging test orifices or articles of different standard sizes. Conveniently the range of sizes for which gauging can be effected will be increased by variation of the size of either or both orifices 7 and 10, and for this purpose the attachments in which these orifices are included will each preferably comprise one of a series of interchangeable nozzles, it being then only necessary to interchange the nozzles when changing the gauging device for a different article or a different measurement. These adjustments or variations of the restrictions 7, 10, 12 are analogous to adjustments in the ratio arms of an electrical Wheatstone bridge.

In an alternative method of operation, the indicating pointer 19 may be adjusted to an off-zero position of equilibrium for the vane, and the standard orifice 10 adjusted so that when the test orifice or article is of correct size there is a flow of fluid through the indicator 18 sufficient to cause restoration of the pointer 19 to the zero position. In this case the air or other fluid is preferably admitted to the duct 1 under substantially constant pressure, for which purpose a pressure regulator 24, of any suitable known type, may be employed. This method of operation may in some cases be the more advantageous in that the operation of the flow indicator is more liable to be satisfactory from the point of view of accuracy when the flow through it is in excess of a certain minimum amount.

I claim:

1. In apparatus for testing or measuring an orifice or for gauging an article adapted to be inserted in a bore of such a nature as to form an orifice, the effective size of which varies with the size of the article, the combination of a source of fluid under substantially constant pressure, a forked duct connected thereto, each branch of which includes means for impeding the flow of fluid, an orifice of standard size to which one of said branches leads, a duct adapted to be connected to the orifice to be measured and to which the other of said branches leads, and a differential fluid flow indicator connected between the branches of said forked duct from a point between one of said fluid-flow impeding means and the standard orifice to a point between the other of said fluid-flow impeding means and the duct adapted to be connected to the orifice to be measured, whereby the size of the standard may be compared with the effective size of the orifice to be measured, said fluid flow indicator comprising a passageway connecting the two duct branches and a vane located in the said passageway with means for biasing it to an off-zero position, and the standard orifice being of such size that when the test orifice or article is of correct gauge size a flow of fluid under the controlled pressure is thereby produced through the flow indicator which is effectual to restore the vane against the bias to the zero position.

2. A duct bridge arrangement comprising an inlet adapted to be connected to a source of fluid under pressure, a pair of parallel ducts connected to said inlet, a directionally responsive biased fluid indicator connected between said ducts to divide each of said ducts into two portions whereby four duct portions are formed connected in series parallel, each of said duct portions including means for impeding the flow of fluid whereby the effect on the fluid indicator is responsive to the relationships between pressure drops in the said portions of the parallel ducts, one of said fluid-flow impeding means consisting of an orifice of standard size, two of them consisting of orifices of predetermined relative size, and the fourth consisting of an orifice which is to be tested or measured, said fluid indicator including means for biasing it to an off-zero position and the standard orifice being of such size that when the test orifice is of a predetermined desired size a pressure relationship in the duct portions is produced which is effectual to restore the fluid indicator against the bias to the zero position.

RALPH POOLE.